United States Patent
Ghatage et al.

(10) Patent No.: US 12,412,050 B2
(45) Date of Patent: Sep. 9, 2025

(54) MULTI-PLATFORM VOICE ANALYSIS AND TRANSLATION

(71) Applicant: ACCENTURE GLOBAL SOLUTIONS LIMITED, Dublin (IE)

(72) Inventors: Prakash Ghatage, Bangalore (IN); Naveen Kumar Thangaraj, Salem (IN); Kumar Viswanathan, San Jose, CA (US); Sattish Sundarakrishnan, Agasthiar Patti (IN); Nirav Jagdish Sampat, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 287 days.

(21) Appl. No.: 17/883,265

(22) Filed: Aug. 8, 2022

(65) Prior Publication Data
US 2023/0325612 A1      Oct. 12, 2023

(30) Foreign Application Priority Data

Apr. 9, 2022   (IN) .............................. 202211021330

(51) Int. Cl.
*G06F 40/58*       (2020.01)
*G06F 16/683*      (2019.01)
(Continued)

(52) U.S. Cl.
CPC ............ *G06F 40/58* (2020.01); *G06F 16/683* (2019.01); *G06F 40/263* (2020.01); *G10L 15/26* (2013.01)

(58) Field of Classification Search
CPC ...... G06F 40/58; G06F 16/683; G06F 40/263; G10L 15/26
See application file for complete search history.

(56) References Cited

U.S. PATENT DOCUMENTS 11,315,569 B1*   4/2022   Talieh ................. H04L 12/1831
11,775,777 B2*  10/2023   Fuerstenau ............ G06N 20/00
                                                           704/2
(Continued)

FOREIGN PATENT DOCUMENTS

CN        103309854 A     9/2013
CN        109033092 A     12/2018
(Continued)

OTHER PUBLICATIONS

Nikkei personal computer No. 285, Japan, Nikkei BP, Mar. 24, 1997, pp. 315-339, with Machine English translation.

(Continued)

*Primary Examiner* — Hai Phan
*Assistant Examiner* — Nathan Tengbumroong
(74) *Attorney, Agent, or Firm* — Mannava & Kang, P.C.

(57) ABSTRACT

An Artificial Intelligence (AI) Driven multi-platform, multi-lingual translation system analyzes the speech context of each audio stream in the received audio input, selects one of a plurality translation engines based on the speech context, and provides translated audio output. If audio input from multiple speakers is provided in a single channel then it is diarized into multiple channels so that each speaker transmitted on a corresponding channel to improve audio quality. A translated textual output received from the selected translation engine is modified with sentiment data and converted into an audio format to be provided as the audio output.

20 Claims, 12 Drawing Sheets

(51) Int. Cl.
   *G06F 40/263*   (2020.01)
   *G10L 15/26*    (2006.01)

(56) References Cited

U.S. PATENT DOCUMENTS

| | | | |
|---|---|---|---|
| 11,915,716 | B2 | 2/2024 | Trim et al. |
| 12,020,708 | B2 * | 6/2024 | Bradley ................... G10L 15/07 |
| 2012/0078607 | A1 * | 3/2012 | Sumita ..................... G06F 40/51 |
| | | | 704/E11.001 |
| 2015/0347396 | A1 | 12/2015 | Goldberger |
| 2016/0078020 | A1 * | 3/2016 | Sumita .................. G06F 40/157 |
| | | | 704/9 |
| 2019/0370283 | A1 * | 12/2019 | Church .................... G06N 3/08 |
| 2020/0302126 | A1 | 9/2020 | Malcangio et al. |
| 2022/0051656 | A1 * | 2/2022 | Rathnam ................ G06F 40/58 |
| 2022/0058349 | A1 * | 2/2022 | Yuan ...................... G06F 40/216 |
| 2022/0417659 | A1 * | 12/2022 | Narayanan ........... G11B 27/036 |
| 2023/0282205 | A1 * | 9/2023 | Wintrode ................ G10L 25/87 |
| | | | 704/251 |

FOREIGN PATENT DOCUMENTS

| | | |
|---|---|---|
| JP | 2000268038 A | 9/2000 |
| JP | 2007052614 A | 3/2007 |
| WO | 2012010583 A1 | 1/2012 |
| WO | WO-2021158247 A1 * | 8/2021 ............ G06F 40/58 |

OTHER PUBLICATIONS

"Notice of Allowance for U.S. Appl. No. 17/900,704", dated Nov. 7, 2024, 9 pages.

* cited by examiner

MULTI-PLATFORM VOICE ANALYSIS AND TRANSLATION

PRIORITY

The present application claims priority under 35 U.S.C. 119(a)-(d) to the Indian Provisional Patent Application Serial No. 202211021330, having a filing date of Apr. 9, 2022, the disclosure of which is hereby incorporated by reference in its entirety.

BACKGROUND

A voice translator can translate voice input to provide translated voice output. The voice translation uses different Application Programming Interfaces (APIs) and speech recognition libraries of different programming platforms. The voice translation can convert text from one language to another language and saves the recorded file. Artificial Intelligence (AI) techniques have enabled intelligence speech recognition technology that makes cross-language communications easier. However, challenges exist in providing high-quality, accurate voice translations through automatic translators.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
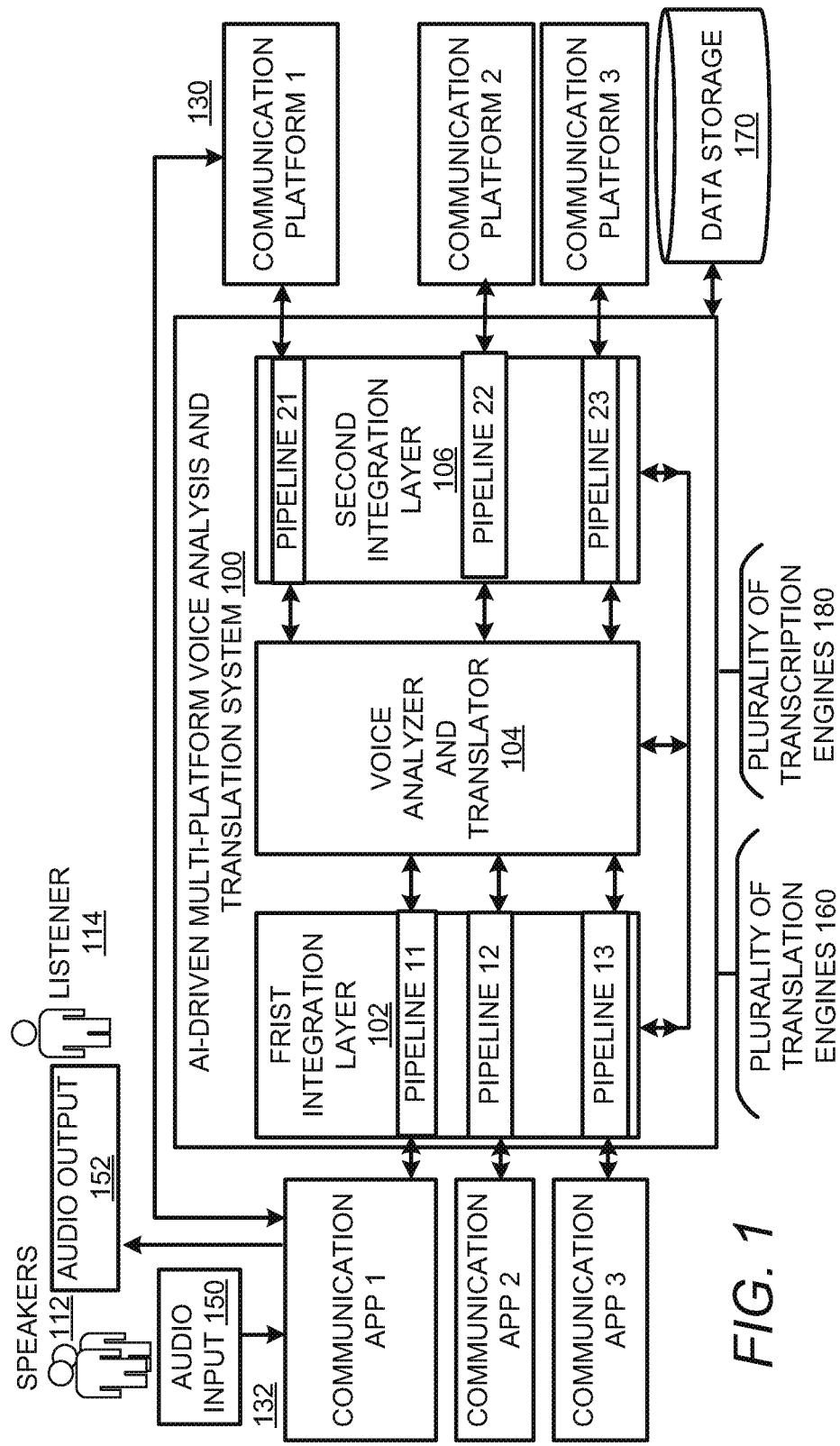
FIG. 1 shows a block diagram of an AI-driven multiplatform translation system in accordance with the examples disclosed herein.

For simplicity and illustrative purposes, the present disclosure Is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-driven multi-platform, multilingual translation system is disclosed. The system provides translation services to a plurality of communication platforms having corresponding communication apps or front ends. To provide translation services, the system is coupled to a plurality of translation engines and a plurality of transcription engines. The system receives an audio input and associated metadata of a communication session from one of the communication apps corresponding to one of the plurality of communication platforms holding the communication session. The communication session can include a real-time communication session such as a teleconference with multiple participants, a recorded session wherein a recording is provided to one or more listeners or a combination of real-time and recording sessions, e.g., wherein a recording is played during a teleconference. The communication apps can include not only mobile applications but any front end employed by one or more of the plurality of communication platforms for facilitating user communications. Accordingly, a desktop application enabling user communications can also be considered a 'communication app'. The audio input and the associated metadata are analyzed to determine the speech context of the audio input. One of the plurality of translation engines is selected based on the speech context for translating the audio input from the source language to a target language. An audio output including the translation of the audio input is provided to one or more listeners of the communication session via the communication app from which the audio input was received. Various other services such as text and grammar correction, summarizing the communication session, etc. are also enabled by the system.

The system includes a voice analyzer and translator coupled to the plurality of communication platforms and the corresponding communication apps via two integration layers. The first integration layer includes platform-specific pipelines connecting the voice analyzer and translator to the corresponding communication apps. The second integration layer includes platform-specific pipelines connecting the voice analyzer and translator to the plurality of communication platforms. Participants of the communication session use one of the plurality of communication platforms and therefore provide the audio input and the associated metadata via the corresponding communication app. The voice analyzer and translator generates the audio output and provides the audio output to the communication platform for transmission to the listener requesting the translation through the communication app.

The audio input and associated metadata are analyzed to determine if multiple speakers are participating in the communication session. If multiple speakers are speaking, the audio input is further analyzed to determine if multiple audio streams of respective multiple speakers are included in corresponding multiple channels or a single channel. If the audio streams are being transmitted in multiple channels then the channels are split. If the multiple audio streams are transmitted in a single channel, then the plurality of speakers or the multiple audio streams are separated out on the corresponding channels via AI-based diarization. Furthermore, the audio input can be transcoded if it is not transmitted in audio formats compatible with the plurality of translation engines.

The audio input is transcribed and a speech context is determined. In an example, the speech context can include among other attributes, the communication platform being used, the source language, the target language, the particular speaker providing the voice input, the domain pertaining to the speech, and other metadata such as the date/time of receipt of the audio input, the length of the voice input of the particular speaker, speaker-specific stream details, etc. The communication session is monitored to detect any change in the speech context. In an example, single-shot language detection is implemented so that the audio input is briefly sampled periodically as part of the speech context detection. When a change in the speech context i.e., any change in the aforementioned attributes is detected, it is further determined if another translation engine needs to be selected in response to the detected change. If yes, another translation engine is selected and the audio output generated from the newly selected translation engine is provided to the listener. The system enables the selection of translation engines via a Q-table. The user feedback on a translation is collected and the Q-table is updated. The next translation request that is received is serviced by referring to the updated Q-table. Thus, if different translation engines produce greater translation accuracies for different voice attributes, then the most accurate translation engines can be selected and used even for a single communication session. Other functions such as a summary of the communication session, sentiment associated with the communications session, actionable items arising from the communication session, etc. can be identified.

The system provides for an end-to-end AI-driven natural language processing (NLP) platform that enables translation of voice communications for a plurality of platforms in a plurality of languages by employing the plurality of translation engines. By separating each audio stream of each speaker into a different channel through diarization, the system improves the audio quality provided to the translation engines thereby increasing the accuracy of the translation output. Furthermore, the translation accuracy is also improved through unique language-based gender models as voice tones for different genders are different. The voice input is converted to text in real-time to further qualify the translation output with sentiment data. The system, therefore, provides near real-time translation with support for both textual and audio formats. The continuous monitoring of the communication sessions enables the system to accommodate on-the-fly changes of source and target languages in addition to efficiently handling translation service outages. The system also provides for realistic audio translation through the continuous sampling of the sentiment of the speaker and transforming the audio output to reflect the speakers' sentiments. The system is customizable as ML models used for language, gender, or sentiment detection can be chosen based on efficiency. The translation is provided in different formats so that users can either choose to listen to the translation or read the translated transcription of the communication session. Furthermore, the system can use cloud platforms to scale thereby supporting numerous users across multiple communication sessions and on multiple communication platforms simultaneously.

FIG. 1 shows a block diagram of an AI-driven multiplatform voice analysis and translation system 100 in accordance with the examples disclosed herein. The voice analysis and translation system 100, functions as a translator for a plurality of communication platforms 130 such as communication platform 1, communication platform 2, communication platform 3, etc. Each of the communication platforms may be coupled to the corresponding communication applications 132 such as communication app 1, communication app 2, communication app 3, etc. Each of the communication apps functions as a front end of the corresponding communication platform for receiving audio input 150 and for providing audio output 152. Examples of communication platforms may include but are not limited to Microsoft Teams®, Amazon Connect Google Duo®, Zoom®, Jitsi®, etc. Therefore, multiple instances of the communication app 1 (which is the frontend of the communication platform 1) may be executed by different user devices of participants including speakers 112 and listener 114 of a communication session being executed on one of the plurality of communication platforms 130 e.g., the communication platform 1. The communication app 1 may include a widget which when activated by the user enables translation of the voice communications as detailed infra so that the user will hear the translated version instead of the original voice.

For example, the audio input 150 may include one or more audio streams from a voice, video, or other communication, wherein a plurality of speakers 112 are speaking in a source language and listeners/audience may be logged in to the communication session to listen to the plurality of speakers. In an example, the audio input 150 can be provided by the communication platform 1 along with the metadata related to the audio input 150. Further, the listeners/audience may not necessarily understand the source language and may request translation of the audio input 150 into one or more target languages which may be provided by the voice analysis and translation system 100. The voice analysis and translation system 100 can be installed or configured as an intermediary between a communication app and the corresponding one of the plurality of communication platforms 130. In an example, the voice analysis and translation system 100 can be installed on an exclusive server providing the intermediary translation services implementing models such as software as a service (Sans) for the plurality of communication platforms 130. When operated from a cloud server, the voice analysis and translation system 100 can be highly scalable and support thousands of users across different platforms concurrently translating their voice inputs into different languages simultaneously. One or more of the plurality of communication apps 132 installed on a user device can have access to the voice analysis and translation system 100 so that the user/audience/listener 114 may obtain translated versions of any audio streams received via the corresponding communication platforms.

The voice analysis and translation system 100 may include a first integration layer 102, a voice analyzer and translator 104, and a second integration layer 106. The first integration layer 102 includes a plurality of pipelines e.g., pipeline 11, pipeline 12, and pipeline 13 communicatively coupling the plurality of communication applications 132 to the voice analyzer and translator 104. The second integration layer 106 also includes a plurality of pipelines e.g., pipeline 21, pipeline 22, and pipeline 23, that are communicatively coupled to the plurality of communication platforms 130. It may be appreciated that since a pipeline is a communication channel that is programmatically created and operated, the pipelines in the first integration layer 102 can be different from the pipelines of the second integration layer 106 as the former connect the voice analysis and translation system 100 with the plurality of communication apps 132 while the latter connects the voice analysis and translation system 100 with the plurality of communication platforms 130. In an example, the pipelines 11 and 21 can be peculiar to the communication platform 1. Similarly, other pipelines used for other platforms can also be platform-specific. The first integration layer 102 and the second integration layer 106 are both bidirectional layers integrating the voice analyzer and translator 104 with each of the plurality of communication platforms 130. The first integration layer 102 can be configured to capture voice communication metadata and the audio streams from the audio input 150 delivering these to the voice analyzer and translator 104. The second integration layer 106 can be configured to receive the output of the voice analyzer and translator 104 and transmit it as the audio output 152 on the communication platform executing the voice communication session to be provided to the user via the corresponding communication app or front end. In an example, the voice analysis and translation system 100 can include Application Programming Interfaces (APIs) that can be called from each of the plurality of communication platforms 130. In an example, the APIs of the voice analysis and translation system 100 may be commonly implemented across the plurality of communication platforms 130, but the APIs can be accessed by different platforms in different ways via the platform-specific pipelines. Processing the metadata allows the voice analysis and translation system 100 to store key aspects of the communication session or call such as the communication platform, the participants, the start time, the end time, joining time for each participant, the audio channel, and the audio format of the communication platform, etc.

When a listener 114 logs into a communication session of the communication platform 1, the listener 114 may select the voice analysis and translation system 100 to translate the audio of the communication session via a selection of the target language. When the listener activates the voice analysis and translation system 100 and selects the target language, the audio input 150 from the communication session may be received by the voice analyzer and translator 104 through the pipeline 21, coupling the communication platform 1 to the voice analyzer and translator 104. In an example, the audio input 150 may also include metadata related to the communication session. By way of illustration and not limitation, the metadata extracted from the audio input 150 can be used to select from third-party cognitive services, one of a plurality of transcription engines 180 and one of a plurality of translation engines 160 for translating the audio input 150 into the target language requested by the listener. The audio output 152 including the translated version is provided to the listener via the corresponding communication application e.g., the communication app 1.

The voice analysis and translation system 100 can thus, receive the audio input 150 in one language and translate it into a different language selected by a listener 114 thereby facilitating multilingual communications between different users of a communication platform. By way of illustration and not limitation, a communication session can include a teleconference on a telephonic meeting between two or more individuals, speaking different languages. The communication session may also include an agent speaking with the client/customer via the client's telephone via one of the plurality of communication platforms 130 and speaking with the client/customer one language, which may be translated for the client/customer into another language while the audio input provided by the client/customer translated for the agent into the agent's preferred language. The voice analysis and translation system 100 can include or can be communicatively coupled to a data storage 170 that stores data generated or required during the audio translation and transmission process.

Figure 2:
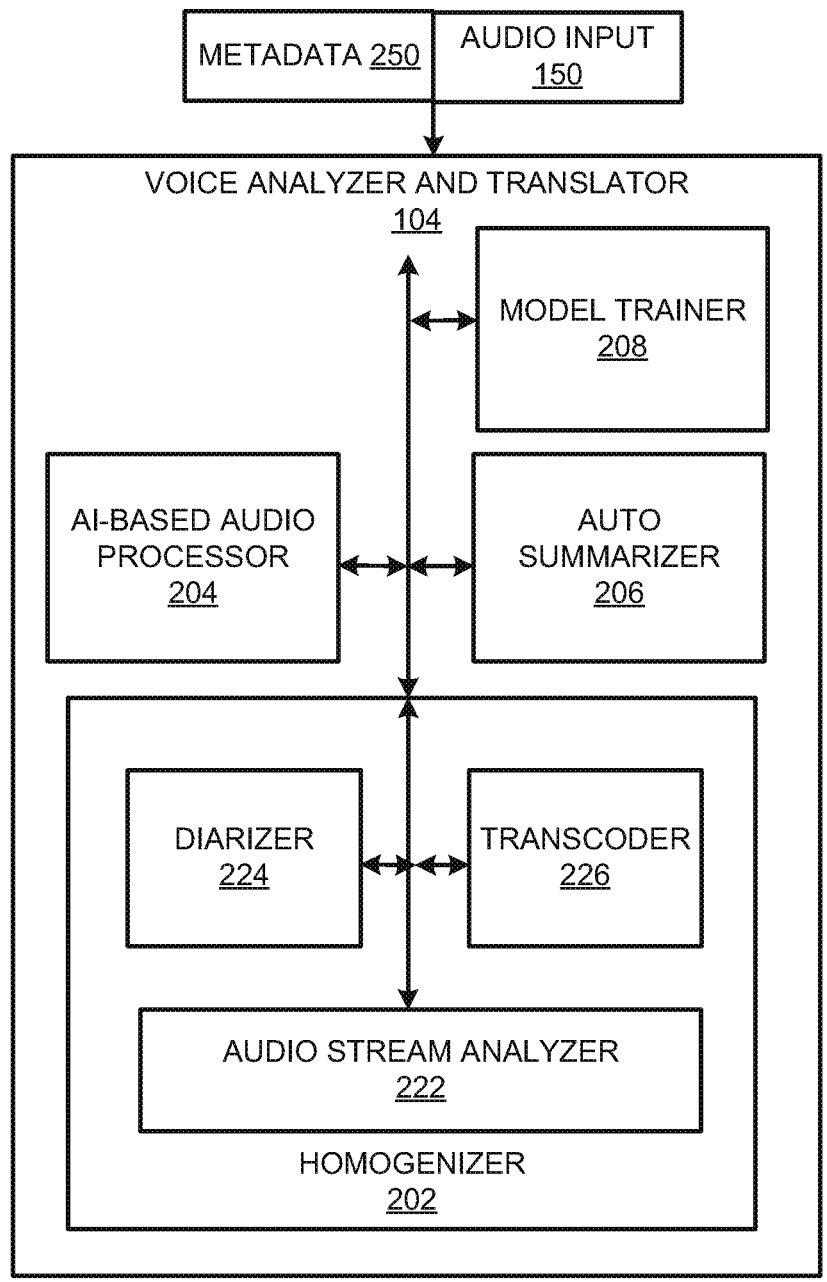
FIG. 2 shows a block diagram of a voice analyzer and translator in accordance with the examples disclosed herein.

FIG. 2 shows a block diagram of the voice analyzer and translator 104 in accordance with the examples disclosed herein. The voice analyzer and translator 104 includes a homogenizer 202, an AI-based audio processor 204, an auto summarizer 206, and a model trainer 208. The homogenizer 202 can further include an audio stream analyzer 222, a diarizer 224, and a transcoder 226. The metadata 250 such as the speaker-specific stream details received with the audio input 150 is analyzed by the audio stream analyzer 222 to determine if one or more of the audio streams in the audio input 150 from the plurality of speakers is received on one channel or multiple channels. Some of the plurality of communication platforms 130 transmit multiple speakers on one channel (mono transmission) while another subset of communication platforms may transmit multiple speakers on separate channels (stereo transmission). In an example, the identity of the particular pipeline of the plurality of pipelines in the first integration layer 102 providing the audio stream to the voice analyzer and translator 104 can be used by the audio stream analyzer 222 to determine if the audio input 150 the audio streams are received in a single channel or multiple channels.

In an example, the audio stream(s) may be received from one of the plurality of communication apps 132 e.g., communication app 1, via a single channel. If the audio stream has multiple speakers and is received on a single channel, then the output of the single channel is provided to the diarizer 224 that splits the audio stream into multiple channels, wherein each speaker's voice output i.e., each audio stream is provided on one channel. On the other hand, if it is determined that the audio streams of different speakers are received in separate channels, then the audio input 150 can be provided by the audio stream analyzer 222 directly to the transcoder 226 without being processed by the diarizer 224.

Furthermore, if the metadata of the audio input 150 indicates that the audio streams are received in formats incompatible with one or more of the AI-based audio processor 204, the transcoder 226 converts the audio streams into acceptable audio formats that can be handled by the plurality of translation engines 160 and the plurality of transcription engines 180. Again, processing of the audio input 150 by the transcoder is optional in that if the audio input 150 is received in formats compatible with the plurality of translation engines 160, then no format transformation is needed. For example, the audio input 150 can be received in Wave audio (.wav), .ogg, oflac, .mp3, etc., formats. The output from the transcoder 206 can include .wav or .mp3 formats. Compact audio formats such as but not limited to .mp3 formats are preferred over lossless formats such as .wav or Free Lossless Audio Codec (.flac) for optimizing processing resources and reducing network latency. Well-tuned transcoding libraries can be used with options provided for optimizing output quality and noise filtration. In the instances where the audio input 150 is received in formats that are incompatible with the voice analyzer and translator 104, the audio input 150 may be processed by the transcoder 226 before being diarized. The output 228 from the homogenizer 202 may include metadata in standard formats which can include information about the speakers, speaker-specific stream details, and the audio streams in compatible formats.

The AI-based audio processor 204 independently processes the audio input 150 which may have been transformed or converted into a compatible format by the transcoder 226. The AI-based audio processor 204 can be configured for detecting the speech context and based at least on the speech context, selecting one of the plurality of translation engines 160 for translating the audio input 150. The plurality of translation engines 160 may include but are not limited to Google® Translate, Azure®, Amazon Web Services (AWS®), SDL Language Cloud®, etc. Similarly, the plurality of transcription engines 180 may include but are not limited to AWS®, Speechmatics®, Azure®, etc. Additionally, the AI-based audio processor 204 can be configured for detecting and correcting sentiments. Therefore, the translated audio output 152 can be configured to convey a 'sentiment'.

An as-is transcript generated by the selected translation engine from the plurality of translation engines 160 may contain noise, sentences split across multiple lines, etc. While it may represent the communication session as it happened, in many cases, this transcript cannot be used as-is. The summarization process implemented by the summary generator 206 identifies and removes noise, merges multi-line dialogues, and attaches sentiments. The final summary can include the summary of the conversation, sentiment, and the details of the speakers. In an example, the final summary can be provided in a textual format as a call transcript. In an example, the final summary can be provided to a text-to-speech engine so that an audio summary of the communication session with the sentiment data is automatically produced.

A model trainer 208 is also included in the voice analyzer and translator 104 to provide feedback. Upon providing the audio output 152 to the participants/listeners, the voice analysis and translation system 100 can collect their feedback. The feedback can be sought in different aspects including but not limited to the accuracy of the translation, the quality of sound, the domain terminology used in the translation, the sentiments expressed in the audio output 152, etc. Based on the received feedback, the model trainer 208 can further train one or more of the ML classification models used for speech context determination.

Figure 3:
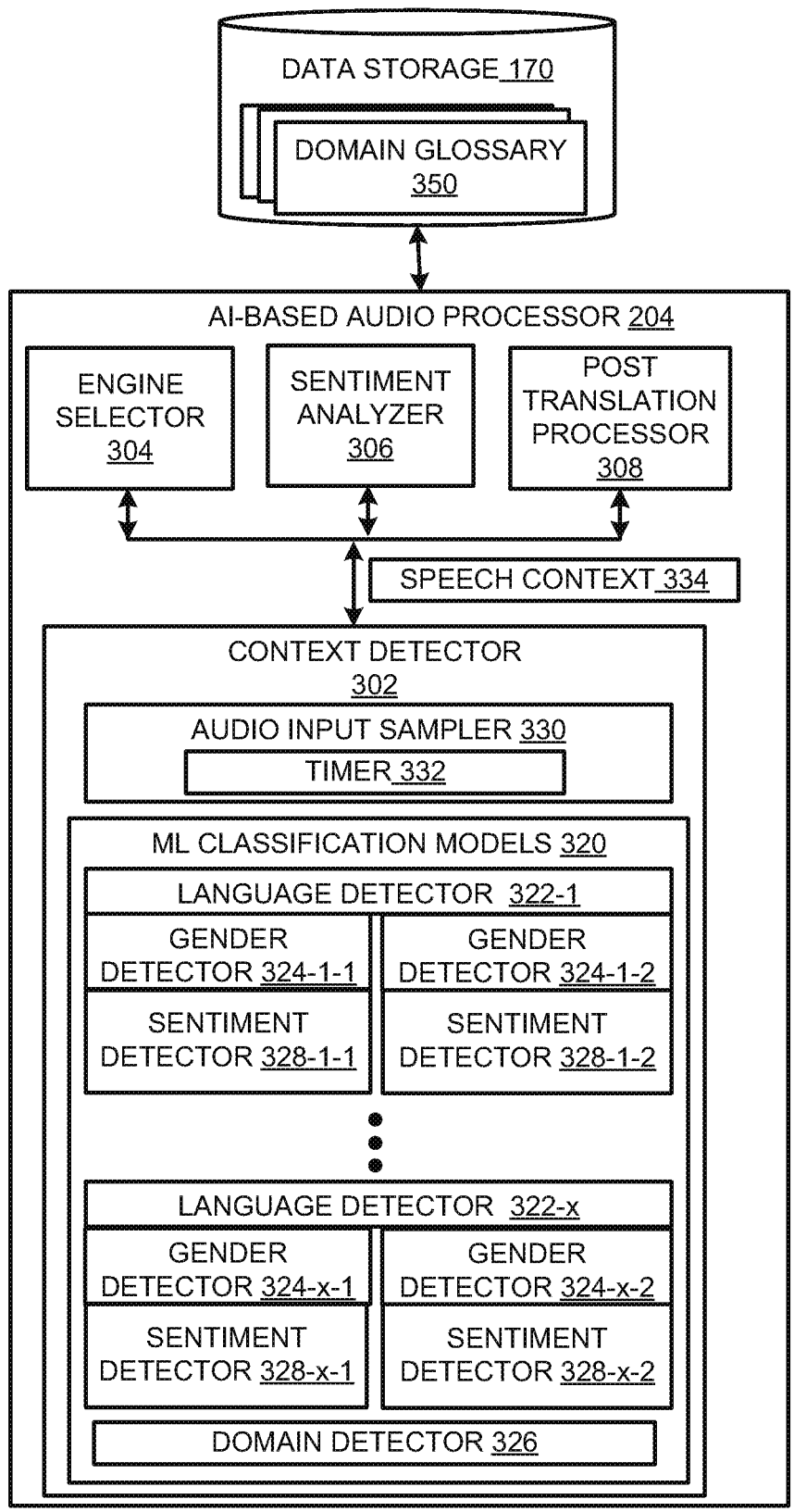
FIG. 3 shows a block diagram of an AI-based audio processor in accordance with the examples disclosed herein.

FIG. 3 shows a block diagram of the AI-based audio processor 204 in accordance with the examples disclosed herein. The AI-based audio processor 204 includes a context detector 302, an engine selector 304, a sentiment analyzer 306, and a post-translation processor 308. The context detector 302 determines a speech context 334 associated with the audio input 150. In an example, speech context 334 can include stream-wise determination of different attributes of the audio input 150. The audio input sampler 330 of the context detector 302 receives the audio input 150 at different times for detecting the different attributes. The attributes may include but are not limited to, the source language of the audio input 150, the domain associated with the audio input 150, the gender 324 of the speaker of the particular audio stream, the sentiment expressed by the speaker, etc. In an example, one or more of the attributes such as the communication platform being used, the domain attributes, and the source and destination languages, can be obtained as explicit user input from the communication platform as the metadata 250.

In an example, trained machine learning (ML) classification models 320 can be employed by each of the language detectors 322-1, . . . , 322-x, the domain detector 326, the gender detectors 324-1-1, . . . , 324-x-2, and the sentiment detector 328-1-1, . . . 328-x-2, included in the context detector 302. A subset of the ML classification models 320 e.g., language detector 322-1, . . . language detector 322-x, can be trained via supervised or unsupervised techniques for identifying x different languages. Each time the voice analysis and translation system 100 is configured to identify/process a new source language the corresponding language detector CNN can be trained. Therefore, multiple CNNs are used for language detection. The voice analysis and translation system 100 can thus be expanded to identify and translate any number of languages provided the corresponding translation engines are available. The source language of the audio input 150 can be identified from the output of one of the language detectors 322-1, . . . , 322-x, with maximum confidence. The language detectors 322-1, . . . , 322-x, can employ language-specific features for language detection. Each language has certain peculiarities in representing text while it is been spoken or written. For example, in Japanese, when addressing a person respectfully/formally by a name then the title "San" is added at the end. The language context helps in refining the translated text after completing the translation.

The detected language is reused so that two gender detectors e.g., 324-1-1 and 324-1-2, . . . , 324-x-1, 324-x-2 are trained for each language. Based on gender and language, the appropriate CNN model is chosen for sentiment analysis. Therefore, the CNN used for sentiment detection is trained to be gender-specific and language-specific. Accordingly, each of the two gender detectors 324-1-1 and 324-1-2 . . . 324-x-1, 324-x-2, trained for each language detector 322-1, . . . , 322-x, also have corresponding pair of gender-specific sentiment detectors 328-1-1, 328-1-2 and 328-x-1, 328-x-2. The output of the sentiment detectors 328-1-1, 328-1-2, and 328-x-1, 328-x-2 is further provided to the sentiment analyzer 306 after translation of the input audio 150 for sentiment correction of the output transcript generated by the selected translation engine. One or more ML domain classification models can be used in the domain detector 326 for the identification of different domains. The ML domain classification models may be trained via supervised and unsupervised techniques as described above. However, in addition to the trained ML models, the domain detector 326 can also employ a plurality of domain glossaries 350 stored for example, in the data storage 170, to identify particular domains based on the meaning of specific terminology. For example, 'fine' in the healthcare domain would mean that everything is ok whereas 'fine' in the taxation or finance domain would mean something different. In an example, the plurality of domain glossaries 350 for various domains in different languages may be used so that when the language detector 322 identifies the source language, a subset of the plurality of domain glossaries 350 of the source language is selected for domain identification by the ML domain classification model.

The speech context 334 output by the context detector 302 is provided to the engine selector 304 that selects one of the plurality of translation engines 160 and one of the plurality of transcription engines 180 for translating/transcribing the audio from the audio input 150. The particular transcription engine selected by the engine selector provides a textual output of the audio input 150 in the source language. The textual output in the source language can be provided to the particular translation engine selected by the engine selector 304. The selected translation engine provides a textual output in the form of an output transcript including a translated version of the transcript generated for the audio input 150. The output transcript is provided to the sentiment analyzer 306 for sentiment correction which produces a modified output transcript. In an example, the sentiment output by the gender-specific sentiment detectors 328-1-1, 326-8-1-2, and 328-x-1, 328-x-2 from the audio input 150 in the source language can be applied to the output transcript in a sentiment correction process. The modified output transcript including the correct sentiment(s) can be provided to the post-translation processor 308 for producing the audio output 152 in the target language using text-to-speech conversion.

The translated textual output is provided to the post-translation processor 308 for post-translation operations such as grammar and spelling correction, sentiment correction, etc. In an example, the post-translation processor 308 can also include a text-to-speech engine (not shown) that is used to produce the audio output 152 in the target language from the translated textual output received from the sentiment analyzer 306. In an example, the functions of the auto summarizer 206 to generate communication session call summary can also be implemented by the post-translation processor 308. The textual summary generated by the auto-summarizer 206 can also be provided to a text-to-speech engine to generate an audio summary of the communication session.

In an example, the audio input sampler 330 can include a timer 332 that may be programmatically manipulated. So long as the voice analysis and translation system 100 operates to translate the streams from the audio input 150, the timer 332 is run for a predetermined time and is reset on the expiration of the predetermined time. When the timer 332 expires, the audio input sampler 330 collects the audio streams from the audio input 150 for analysis by the various detectors in the context detector 302. Thus, any changes in speech context 334 including changes of speakers, changes in the domain, sentiment, or even language can be detected. Changes in the speech context 334 can also include an outage of the selected translation engine necessitating the selection of another translation engine. Each time a change in the speech context 334 is detected, it can trigger the engine selector 304 to execute the engine selection process to that the plurality of translation engines 160, the plurality of transcription engines 180 are re-evaluated to determine the optimal engine for the altered speech context. When the optimal translation engine is located for the new speech context, the audio output 152 can be obtained from the newly-selected optimal engine(s). Therefore, the translated output produced by the voice analysis and translation system 100 is superior to the translated output produced by a translation process wherein a translation service is selected once at the commencement of a voice session and used until the conclusion of the session. This is because reevaluation and reselection of the translation engines with changes in the speech context 334 enables the voice analysis and translation system 100 to capture nuances that are otherwise missed by the translation process where the same translation engine is used throughout the session.

Figure 4:
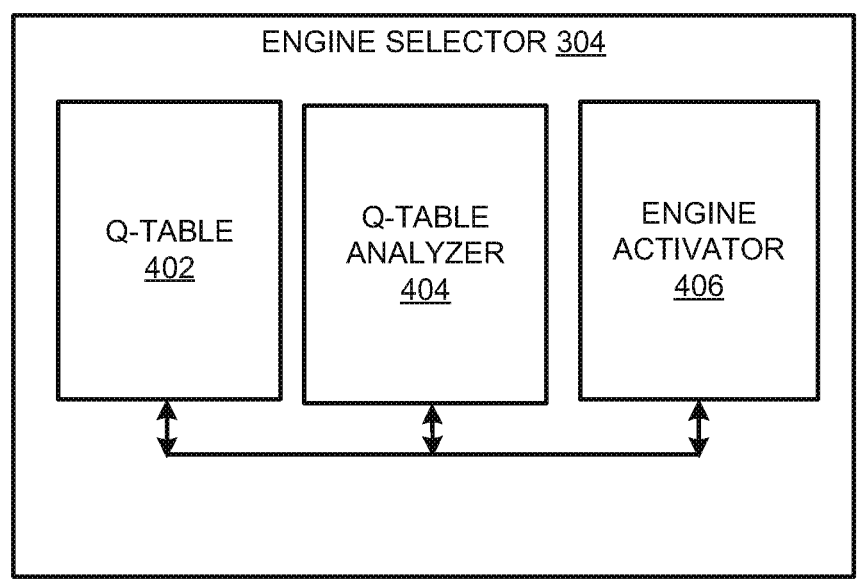
FIG. 4 shows a block diagram of an engine selector in accordance with the examples disclosed herein.

FIG. 4 shows a block diagram of the engine selector 304 in accordance with the examples disclosed herein. The engine selector 304 includes a Q-table 402, a Q-table analyzer 404, and an engine activator 406. The Q-table analyzer 404 uses a Q-learning algorithm which is a model-free reinforcement learning algorithm to predict the best translation engines from the plurality of translation engines 160 for each source/target language pair and domain context. The algorithm can use the Bellman equation to compute the Quality values (Q-values). The Q-table 402 is first built for each source and target language pair and a domain context combination with n rows (wherein n=number of the plurality of translation engines 160) and m columns (wherein m=number of states each translation engine can take e.g., excellent, good, average, poor, unsupported, etc.).

When a new engine is introduced or during the initial setup, the Q-table analyzer 404 is expected to be in its training stage. At this point, input from language experts and Subject Matter Experts (SMEs) can be utilized to evaluate each of the plurality of translation engines at random and provide accurate feedback before handing over the new engines to the users. Accordingly, the engine activator 406 can be initially made to pick a translation engine from the plurality of translation engines 160 randomly based on the language pair. The values for the selected engine can be updated by the Q-table analyzer 404. When the feedback is collected in response to the provided audio output 152, the Q-table analyzer 404 can further update the Q-table 402 based on the received feedback. As the number of iterations increases, the Q-table analyzer 404 will be able to compute a more accurate Q-value based on the feedback from the users and hence improve in its predictions of the best engine for each speech context and source/target language pair.

Figure 5A:
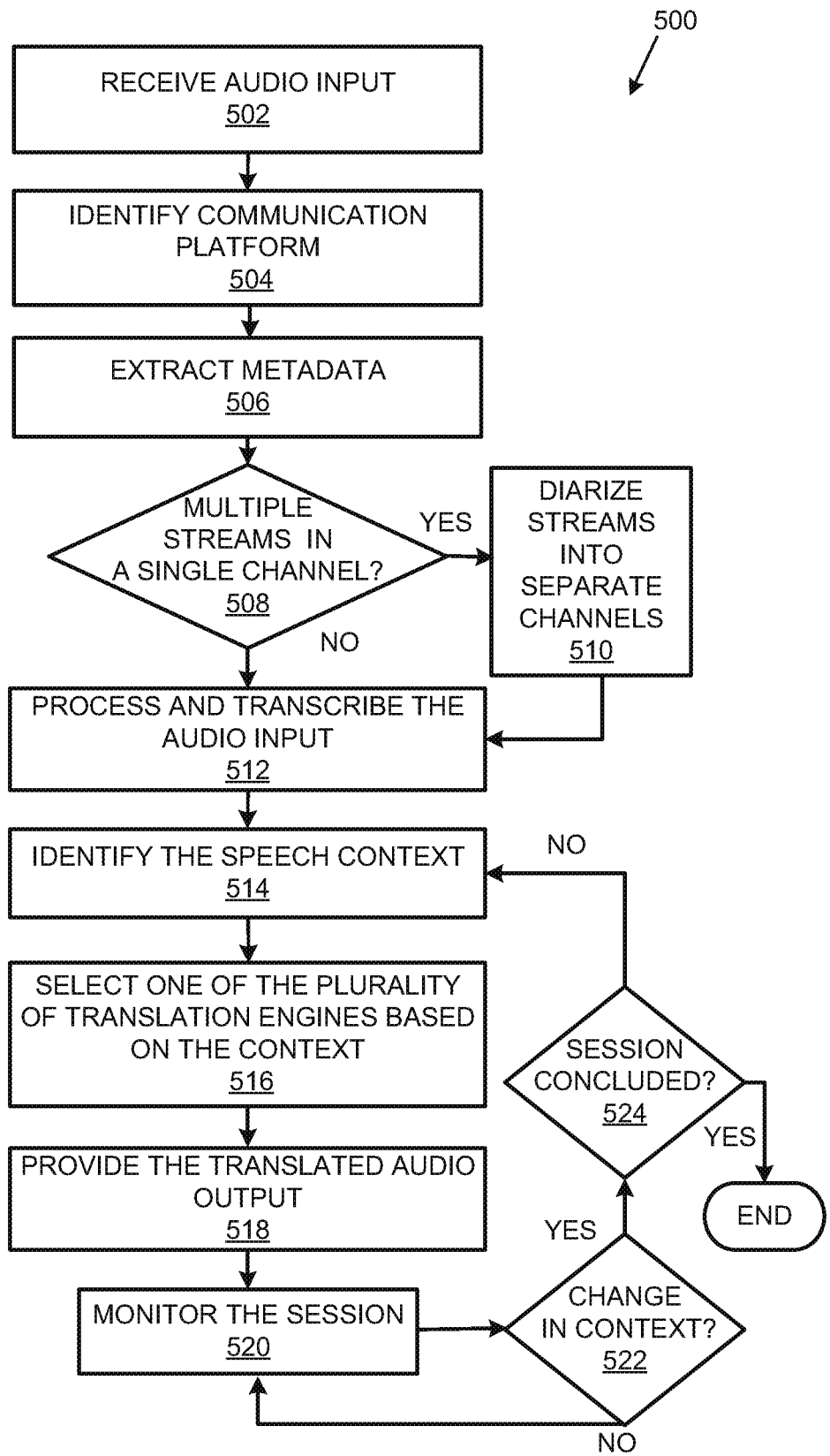
FIG. 5A shows a flowchart that details a method of providing translation services for the plurality of communication platforms in accordance with the examples disclosed herein.

FIG. 5A shows a flowchart 500 that details a method of providing translation services for the plurality of communication platforms in accordance with the examples disclosed herein. The method begins at 502 wherein the audio input 150 is received from one of the plurality of communication platforms 130. The audio input 150 can be received in a communication session, such as but not limited to a teleconference with multiple participants including one or more speakers and/or listeners, a conversation between two or more speakers, a voice recording including a soundtrack of a movie, an audio play, etc. In an example, the multiple participants may be speaking in multiple languages. Therefore, a participant may require the translation of portions of or all of the conversation. At 504, the communication platform via which the audio input 150 is received is identified e.g., communication platform 1. In an example, the audio input 150 can be received via one of the pipelines e.g., pipeline 11 of the first integration layer 102 from the communication app e.g., communication app 1. The metadata 250 of the audio input 150 is extracted at 506. In an example, the metadata 250 can be provided explicitly by the user requesting the translation. The metadata 250 can include but is not limited to, the number of speakers, the languages used, the target language into which the audio input 150 is to be translated, the domain context of the conversation, speaker-specific stream details, etc.

Based on the extracted metadata, e.g., the speaker-specific stream details it can be determined at 508 if the audio stream(s) received in the audio input 150 includes multiple speakers hi a single channel. For example, some communication platforms may include multiple speakers in a single channel, especially for recordings of voice communications, while some communication platforms transmit multiple speakers on multiple channels. If it is determined at 508 that multiple speakers or multiple audio streams are transmitted in a single channel, the method moves to 510 wherein the AI-based diarization process is executed to separate the multiple streams into separate channels so that one speaker is transmitted on one channel. Thus, the quality of the audio provided to the translation engine is improved thereby translated output of higher quality is obtained. If it is determined at 508 that multiple speakers are on multiple channels the method moves to 512 to process the audio input 150 and to generate a transcription of the audio input 150 in the source language. The transcription can be generated by one of the plurality of transcription engines 180 which may be selected based on the metadata 250. The processing of the audio input 150 can include transcoding the audio Input 150 into audio formats that are compatible with one or more of the plurality of translation engines 160.

The text output from the transcription is used for identifying the speech context 334 at 514. Different ML classification models 320 are used for identification of the speech context 334. In an example, the context detector 302 implements stream-wise processing of the audio input 150 for the detection of speech context 334. Based on the speech context 334, one of the plurality of translation engines 160 is selected at 516 for translating the audio input 150. The audio output 152 translated into the target language is provided at 518. Throughout the communication session, the audio streams being input to the voice analysis and translation system 100 are monitored at 520 and it is determined if there is a change in the speech context 334 at 522. If it is detected at 522 that there is a change in the speech context 334, the method moves to 524 to determine if the change in speech context includes a conclusion of the communication session. If yes, the method terminates on the end block. If it is determined at 524 that the communication session has not concluded then the method moves to 514 to identify the new speech context. If no change in the speech context is detected at 522, the monitoring of the communication session continues at 520 and the process can be repeated.

Figure 5B:
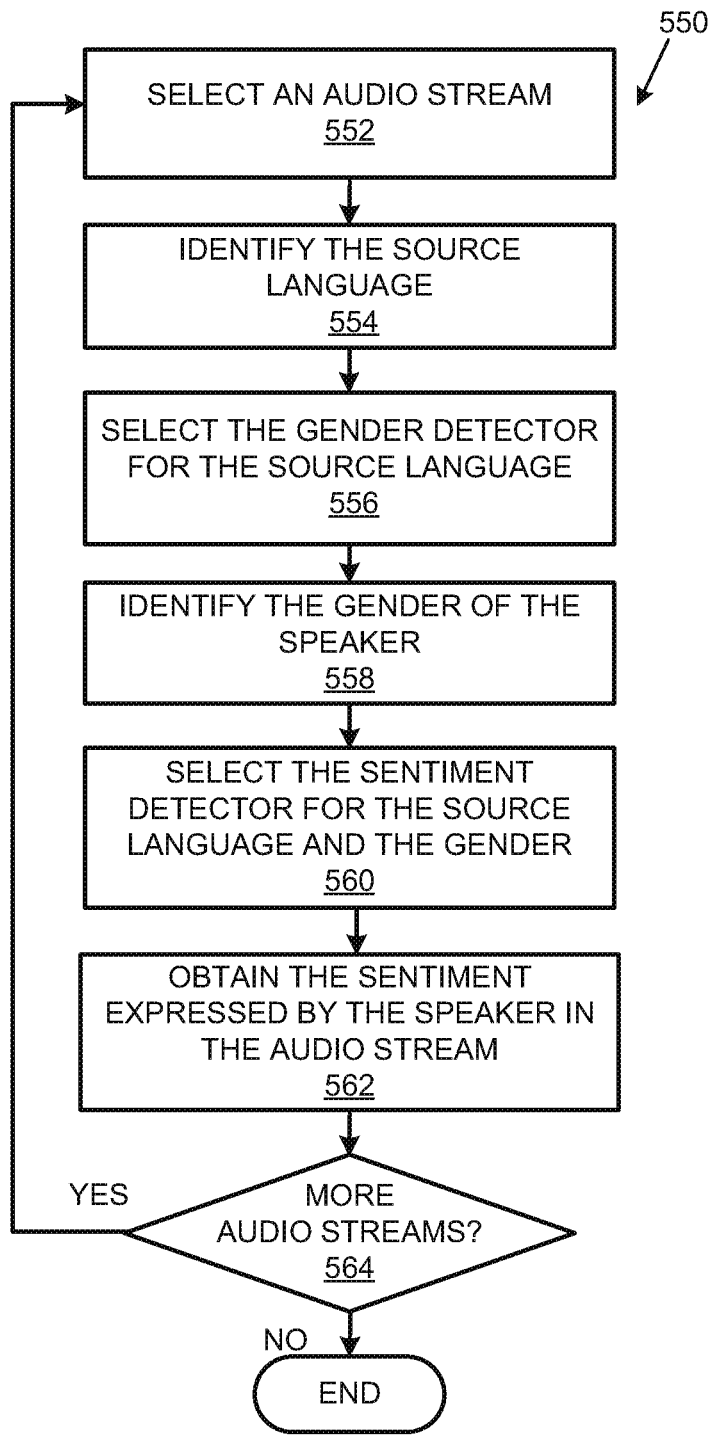
FIG. 5B shows a flowchart that details a process of identifying a speech context in accordance with the examples disclosed herein.

FIG. 5B shows a flowchart 550 that details a process of identifying the speech context 334 in accordance with the examples disclosed herein. Although the flowchart 550 shows that the audio streams from the audio input 150 are processed serially, it can be appreciated that this is not necessary and that all the audio streams received in the audio input 150 can be processed simultaneously in parallel processing. Initially, an audio stream from the audio input is selected at 552. The audio stream can include voice input from one of the speakers 112 participating in the communication session. The source language used by the speaker is identified at 554. The source language can be identified via the metadata 250 wherein a user explicitly inputs the source language being used or may be automatically identified from available language identification tools. Alternately, the source language can be automatically identified from one of the language detectors 322-1, . . . , 322-x. Upon identification of the source language, the gender detectors corresponding to the source language are selected at 556. The gender of the speaker is identified by the language-specific gender detectors at 558. At 560, the sentiment detector associated with the particular source language and gender is selected and the sentiment expressed by the speaker in the audio stream is obtained from the selected sentiment detector at 562. It is determined at 564 if more audio streams need to be processed. If yes, the method returns to 552 to select the next audio stream, else the method terminates on the end block.

Figure 6:
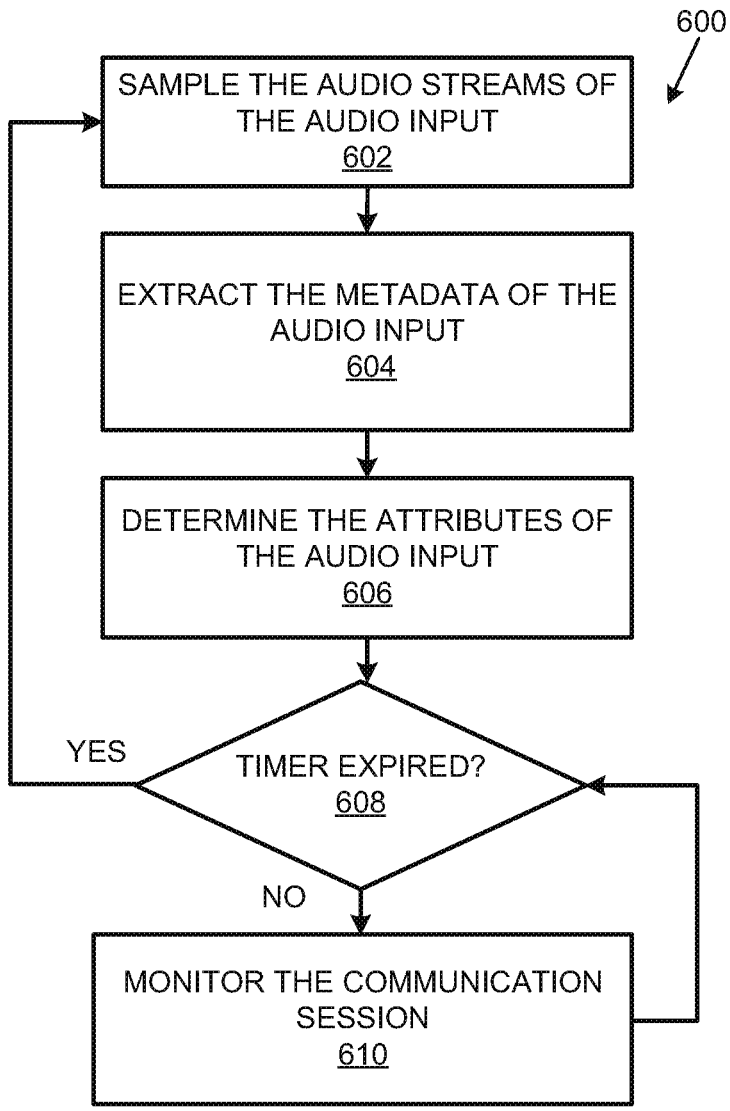
FIG. 6 shows a flowchart that details a method of monitoring a communication session in accordance with the examples disclosed herein.

FIG. 6 shows a flowchart 600 that details the process of monitoring a communication session in accordance with the examples disclosed herein. The method begins at 602 wherein the audio streams of the audio input 150 are sampled. The audio streams may be sampled at the beginning of the communication session or upon the expiry of the timer 332. The attributes/the metadata 250 are obtained at 604. For example, the source language, the target language, domain, the number of speakers, the communication platform being used, etc., can be obtained from the metadata 250. Different trained ML classification models are employed at 606 to determine different attributes of the audio input 150 not extracted from the metadata 250 in the speech context determination. For example, gender determination, sentiment determination, domain context determination (if not provided by the user), etc., can be executed 606. It may be appreciated that the timer 332 continues to run during the speech context determination process. Accordingly, at 608 it is determined if the timer 332 has expired. If it is determined that the timer 332 has expired, the method returns to 602 to sample the audio streams. If it is determined at 608 that the timer 332 has not expired, the voice analysis and translation system 100 continues to monitor the communication session 610.

Figure 7:
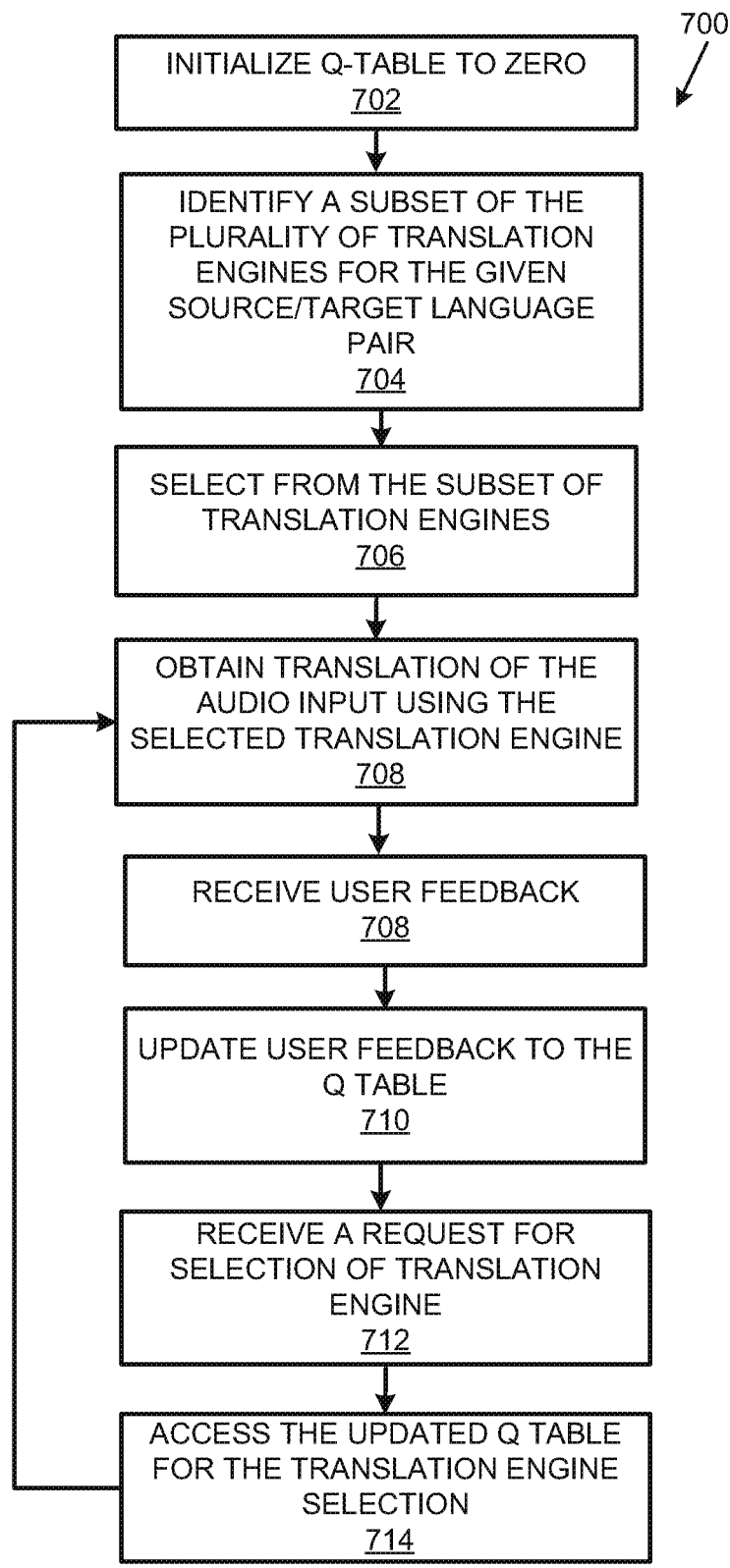
FIG. 7 shows a flowchart that details a method of selection of a translation engine in accordance with the examples disclosed herein.

FIG. 7 shows a flowchart 700 that details the process of selection of the translation engine in accordance with the examples disclosed herein. As mentioned above, the engine selector 304 employs the Q-learning algorithm. The Q-table 402 is initialized to zero at 702 in the initial setup or when a new translation engine is inducted into the voice analysis and translation system 100. Based at least on the metadata, the engine selector 304, selects a translation engine the plurality of translation engines 160 at 704. Initially, when the Q-table is not populated with sufficient data, the engine selector 304 may make random choices from a subset of the translation engines available from the plurality of translation engines 160 for a given source/target language pair. At 706, the selected translation engine is used in the translation of the audio input 150. The user feedback on the choice of translation engine (random or otherwise) is obtained at 708 and updated to the Q-table at 710. When a request for selection of the translation engine at 712, the Q-table is accessed at 714 for the choice of the translation engine. The translation engine with the maximum Q-values for the pair of source and target languages can be identified from the Q-table. The method returns to selecting a translation engine at 704. However, in the next iteration, the selection of the translation engine at 704 can factor in the user feedback received for prior translations via the updated Q-table values. As the number of iterations increases, the engine selector 304 will be able to compute more accurate Q-values based on the feedback from the user and hence improves in its predictions of the best translation engine for each context and language pair.

Figure 8:
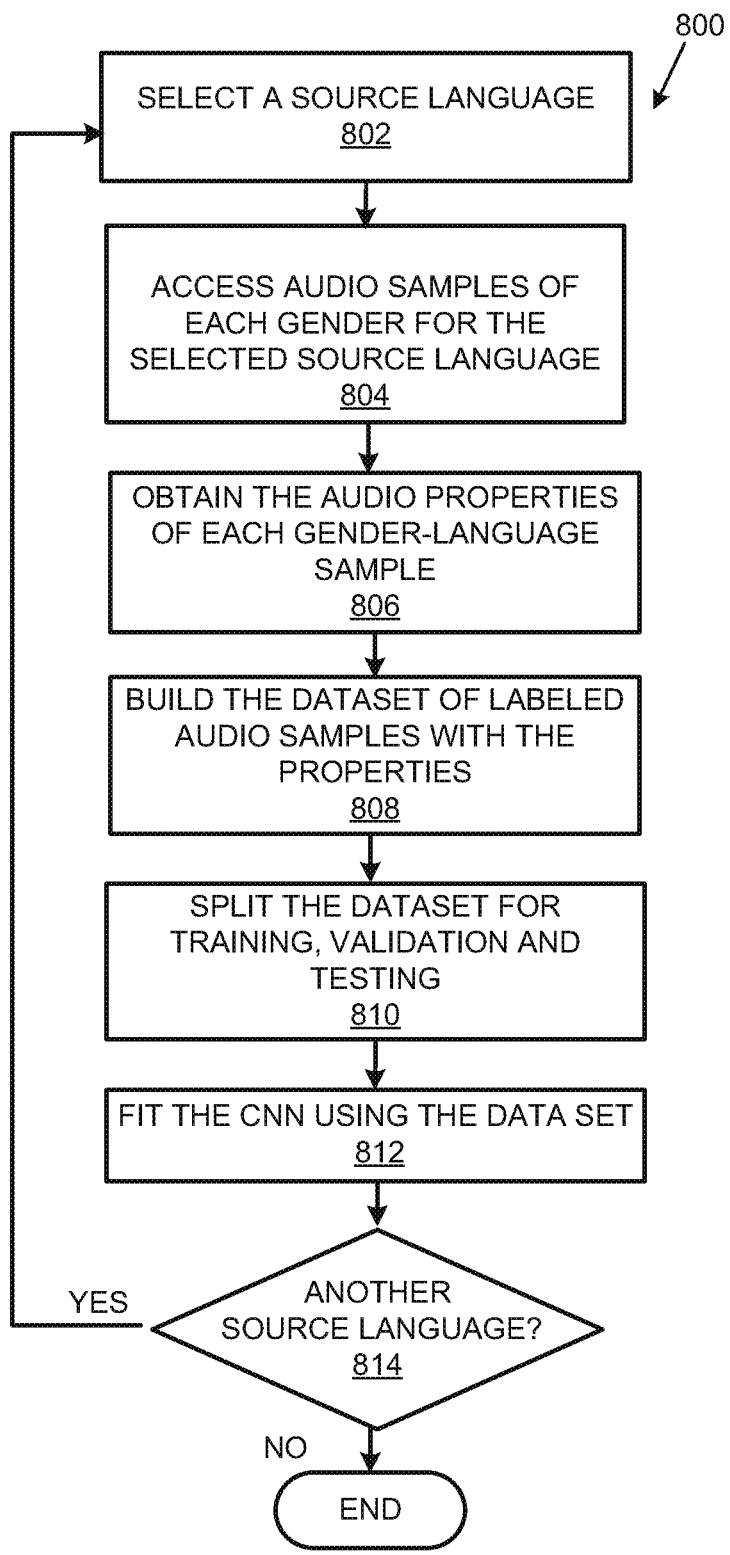
FIG. 8 shows a flowchart that details a method of training a convolution neural network (CNN) for detecting gender in accordance with the examples disclosed herein.

FIG. 8 shows a flowchart 800 that details a method of training a CNN for detecting gender in accordance with the examples disclosed herein. The method begins at 802 wherein a source language is selected for training a CNN to identify a gender for that source language. The CNN can be trained via supervised methods by providing labeled training data. Since the tone of the speaker (male vs female) can create accuracy issues, a separate model is trained for each gender. Therefore, for each source language, e.g., language detector 322-1, two gender detection CNNs e.g., gender detectors 324-1-1 and 324-1-2, are trained. Accordingly, data including numerous audio samples collected for each gender for the selected source language may be accessed at 804. At 806, the audio properties of each gender-language audio sample are obtained using, for example, the libroasa library. The audio properties can include but are not limited to mfccs, chroma, mel, contrast, tonnetz, etc. A dataset including gender-labeled audio samples along with the audio properties is thus built at 808. The data is split into training, validation, and testing datasets at 810. The CNN for gender detection is built using the training data and the model is fitted using the testing data at 812. It is determined at 812 if a CNN for another language is to be trained. If yes, the method returns to 802 to select the other language.

Figure 9:
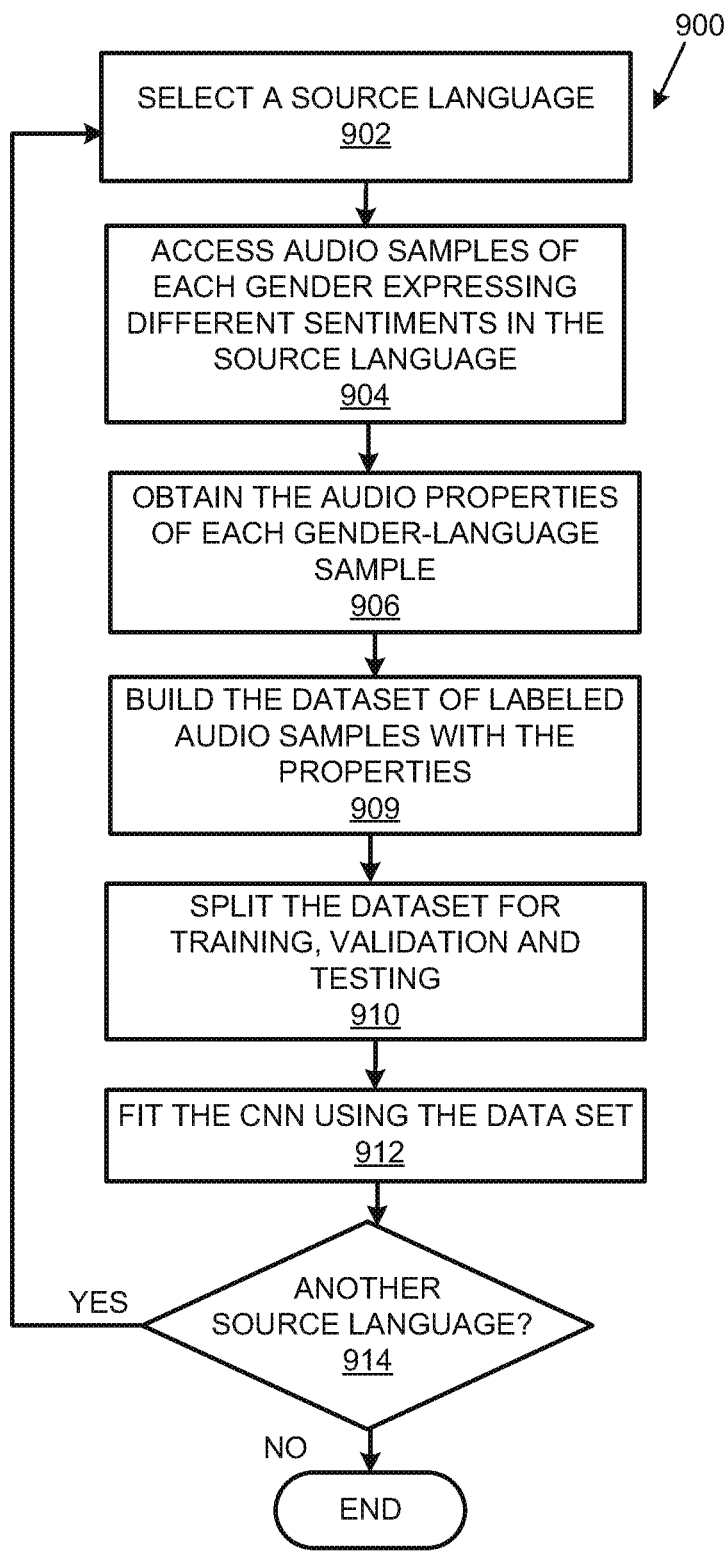
FIG. 9 shows a flowchart that details a method of training a CNN for detecting sentiment in accordance with the examples disclosed herein.

FIG. 9 shows a flowchart 900 that detail a method of training a CNN for detecting sentiment in accordance with examples disclosed herein. Sentiment detection as implemented by the voice analysis and translation system 100 is language and gender-specific, hence a separate CNN model is built for each input language and gender combination. The method begins at 902 wherein a source language is selected for training a CNN to identify sentiments for that source language. The CNN can be trained via supervised methods by providing labeled data. Since the tone of the speaker (male vs female) can create accuracy issues, a separate sentiment model is trained for each gender for the selected source language. Therefore, two gender-specific sentiment detection CNNs, e.g., sentiment detectors 328-1-1 and 328-1-2, are trained. Accordingly, numerous audio samples collected for each gender expressing different sentiments for the selected source language may be accessed at 904. At 906, the audio properties of each gender-language audio sample are obtained using, for example, the libroasa library. The audio properties can include but are not limited to Mel Frequency Cepstral Coefficients (MFCCS), chroma features represent the spectral energy distribution within an analysis frame, Mel is a unit of measure based on the human ear's perceived frequency, contrast, Tonnetz (German for 'tone network') is a conceptual lattice diagram representing tonal space, etc. A dataset including sentiment-labeled audio samples along with the audio properties is thus built at 908. Thus, the sample data is segregated by gender and language. The data is split into training, validation, and testing datasets at 910. The CNN for sentiment detection is built using the training data and the model is fitted using the testing data at 912. It is determined at 912 if a CNN for sentiment detection in another language is to be trained. If yes, the method returns to 902 to select the other language. This combination of separate gender, language, and sentiment detection enables detection of the gender and language at lower audio sampling frequencies, and sentiment at a higher sampling frequency. The corresponding CNN models are also tuned separately for more accuracy.

The translated output text may accurately represent the meaning of the speech, but may not reflect the sentiment or emotion of the speaker. The addition of emotions makes the translated audio output more realistic. Pre-trained advanced natural language processing (NLP) models can be used by the sentiment analyzer 306 for text transformation. These models provide greater accuracy and speed if trained for specific languages. Hence based on the output translated language, the NLP model can be chosen. The NLP model can be derived from the text2text generation models from the transformers library. The NLP model can be tuned using custom datasets and a tokenizer. Since this is a translation operation, the NLP model will need to be fine-tuned for each language using language-specific data sets. Based on the sentiment of the speaker, the NLP model can generate sentences that are more suitable for the speaker's sentiment or emotion. The transformed text will be fed to the Text-to-Speech engine of the post-translation processor 308 for the audio output.

Figure 10:
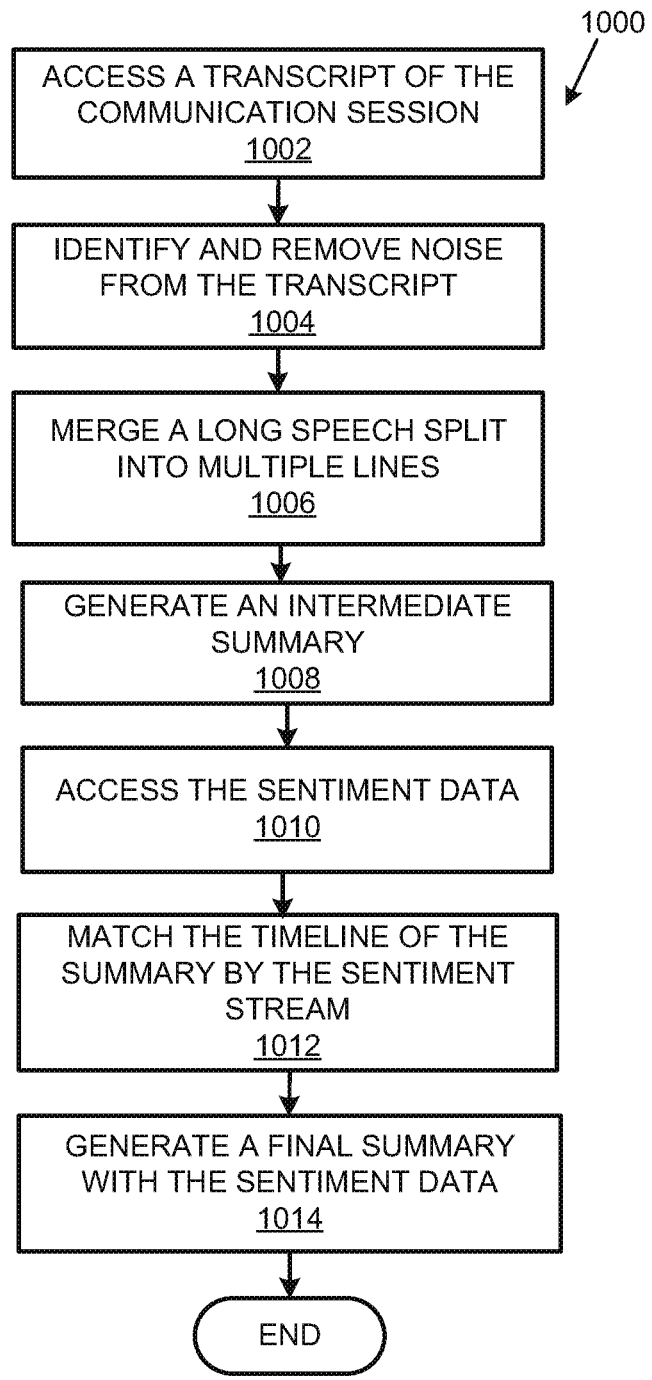
FIG. 10 details a method of generating a summary of the communication session n accordance with the examples disclosed herein.

FIG. 10 shows a flowchart 1000 that details a method of generating a summary of the communication session in accordance with the examples disclosed herein. An as-is transcript of the communication session may contain lots of noise, sentences split across multiple lines, etc. While it may represent the communication session as it happened, in many cases, this transcript cannot be used as-is and needs to be further processed. The post-translation processor 308 can be configured to generate a textual summary of the communication session. At 1002, the as-is transcript of the audio input 150 as generated by one of the plurality of transcription engines 180 is accessed. At 1004, noise is identified and removed from the transcription. Noise can include hold time transcription, background noise or noisy utterances, etc. At 1006, a long speech that may be split across multiple lines by the transcription engine is merged. In an example, steps 1004 and 1006 can be performed by the LexRank method of text summarization which uses a graph-based approach. An intermediate summary of the communication session is generated at 1008. In an example, algorithms including but not limited to Recurrent Neural Networks (RNN), Knuth-Morris-Pratt (KMP), simplenlg. Support Vector Machines (SVM), etc., can be implemented to generate actionable items, and the intermediate summary. At 1010, the sentiment information made available by the sentiment analyzer 306 as a stream is accessed. The timeline of the summary obtained at 1008 is matched with the sentiment stream at 1012. The final summary including the summary of the conversations, sentiments, and details of the speakers can be generated at 1014.

Figure 11:
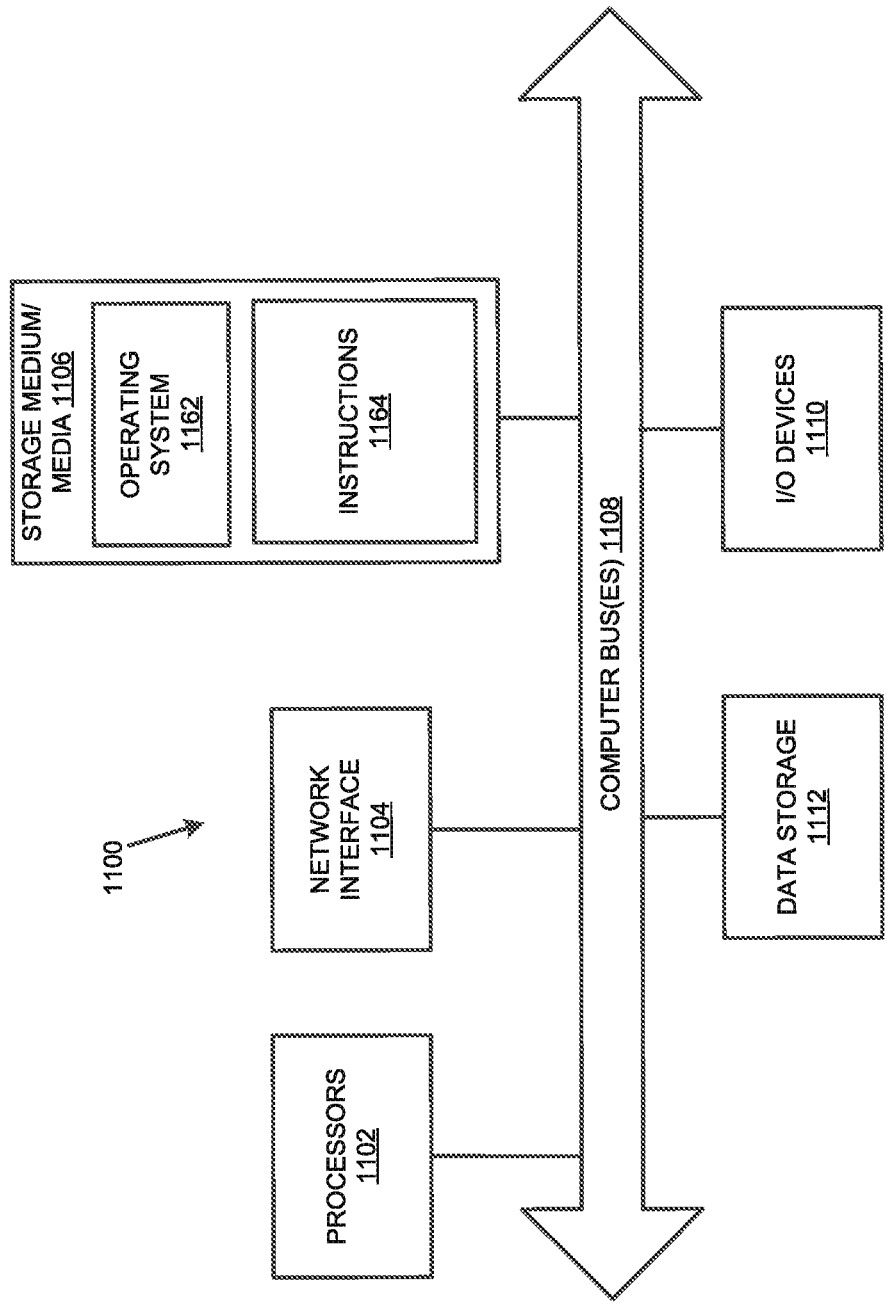
FIG. 11 illustrates a computer system that may be used to implement the AI-driven multiplatform translation system according to some examples disclosed herein.

FIG. 11 illustrates a computer system 1100 that may be used to implement the voice analysis and translation system 100 in accordance with the examples disclosed herein. More particularly, computing machines such as desktops, laptops, smartphones, tablets, and wearables which may be used to generate or access the data from the voice analysis and translation system 100 may have the structure of the computer system 1100. The computer system 1100 may include additional components not shown and that some of the process components described may be removed and/or modified. In another example, a computer system 1100 can sit on external-cloud platforms such as Amazon Web Services, AZURE® cloud or internal corporate cloud computing clusters, or organizational computing resources, etc.

The computer system 1100 includes processor(s) 1102, such as a central processing unit, ASIC or another type of processing circuit, input/output devices 1110, such as a display, mouse keyboard, etc., a network interface 1104, such as a Local Area Network (LAN), a wireless 802.11x LAN, a 3G, 4G or 5G mobile WAN or a WiMax WAN, and a processor-readable medium 1106. Each of these components may be operatively coupled to a bus 1108. The processor-readable or computer-readable medium 1106 may be any suitable medium that participates in providing instructions to the processor(s) 1102 for execution. For example, the processor-readable medium 1106 may be a non-transitory or non-volatile medium, such as a magnetic disk or solid-state non-volatile memory, or a volatile medium such as RAM. The instructions or modules stored on the processor-readable medium 1106 may include machine-readable instructions 1164 executed by the processor(s) 1102 that cause the processor(s) 1102 to perform the methods and functions of the voice analysis and translation system 100.

The voice analysis and translation system 100 may be implemented as software or machine-readable instructions stored on a non-transitory processor-readable medium and executed by one or more processors 1102. For example, the processor-readable medium 1106 may store an operating system 1162, such as MAC OS, MS WINDOWS, UNIX, or LINUX, and code 1164 for the voice analysis and translation system 100. The operating system 1162 may be multi-user, multiprocessing, multitasking, multithreading, real-time, and the like. For example, during runtime, the operating system 1162 is running and the code for the voice analysis and translation system 100 is executed by the processor(s) 1102.

The computer system 1100 may include a data storage 1110, which may include non-volatile data storage. The data storage 1110 stores any data used by the voice analysis and translation system 100. The data storage 1110 may be used as the data storage 170 to store the audio input 150, the speech context 334 including various attributes of the audio input 150, and other data elements which are generated and/or used during the operation of the voice analysis and translation system 100.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) driven multi-platform voice analysis and translation system, comprising:
   a plurality of integration layers associated with a voice analyzer and a translator of the multi-platform voice analysis and translation system, wherein the plurality of integration layers includes a first integration layer which includes a first plurality of pipelines that communicatively couples a plurality of communication applications to the voice analyzer and the translator, and a second integration layer includes a second plurality of pipelines that communicatively couples the voice analyzer and translator with a plurality of communication platforms;
   at least one processor, wherein the processor includes a context detector, an engine selector, a sentiment analyzer, and a post-translation processor;
   a non-transitory processor-readable medium storing machine-readable instructions that cause the processor to:
   analyze metadata of an audio input from one or more speakers speaking in at least one source language during a communication session, wherein the audio input includes one or more audio streams provided by a communication platform from the plurality of communication platforms,
   wherein the first integration layer captures the metadata and audio streams from the audio input and transmits to the voice analyzer and the translator;
      identify, using the context detector, a speech context associated with the audio input based on the metadata, wherein the speech context includes stream-wise determination of different attributes of the audio input from the one or more speakers at different times and the at least one source language and a target language,
         wherein the speech context is identified based on a Machine Learning (ML) classification model;
      select, using the engine selector, at least one translation engine from a plurality of translation engines for each of the one or more speakers based on the speech context,
         wherein the at least one translation engine provides an output transcript of the audio input translated from the source language to a target language;
      collect feedback from each of the one or more speakers at different times of the audio input from the one or more speakers based on an accuracy of the output transcript;
      train the ML classification model based on the collected feedback from each of the one or more speakers to identify the speech context;
      generate, using the sentiment analyzer, a modified output transcript by modifying the output transcript with a sentiment stream determined from the audio input;
      provide an audio output generated from the modified output transcript, wherein the second integration layer is configured to:
         receive the audio output of the voice analyzer and the translator, and
         transmit the audio output through at least one of the other plurality of communication platforms that execute the communication session to the one or more speakers via the corresponding communication application from the plurality of communication applications;
      monitor the audio input from the one or more speakers;
      determine that the speech context has changed for at least one of the one or more speakers; and
      repeat the steps of identifying the speech context, selecting at least one of the plurality of translation engines in response to the determination regarding the change of the speech context, providing, using the post-translation processor, the audio output, and monitoring the audio input until conclusion of the communication session.

2. The voice analysis and translation system of claim 1, wherein to provide the audio output the processor is to further:
   transmit the audio output to at least one listener via a platform-specific pipeline from the plurality of pipelines to a communication application from the plurality of communication applications corresponding to the communication platform.

3. The voice analysis and translation system of claim 1, wherein to analyze the metadata of the audio input, the processor is to:
   receive the metadata and the one or more audio streams via a pipeline specific to the communication platform, the pipeline is one of the plurality of pipelines associated with the plurality of communication platforms; and
   extract and store the metadata including the communication platform, participants including the plurality of speakers, start time, end time, joining time of the participants, and the channels corresponding to each of the one or more speakers if the audio streams are transmitted on separate channels and audio format of the audio input.

4. The voice analysis and translation system of claim 1, wherein the processor is to further:
   determine based on the analysis of the metadata if the audio streams from the one or more speakers are transmitted on corresponding separate channels.

5. The voice analysis and translation system of claim 4, wherein the one or more speakers include a plurality of speakers, and the processor is to further:
   separate the plurality of speakers on the corresponding channels via Artificial Intelligence (AI)-based diarization, if it is determined that the audio input from the plurality of speakers is received on one channel.

6. The voice analysis and translation system of claim 4, wherein the processor is to further:
separate the plurality of speakers in the audio input based on the analysis of the metadata by splitting the corresponding channels if it is determined that the audio input from the one or more speakers is received on the separate channels.

7. The voice analysis and translation system of claim 4, wherein the processor is to further:
transcode the audio input into one or more acceptable formats for the plurality of translation engines.

8. The voice analysis and translation system of claim 1, wherein to identify the speech context associated with each of the plurality of speakers, the processor is to:
generate a textual output of the audio input by transcribing the audio input; and
identify from the metadata and the textual output, one or more of information about the plurality of speakers, speaker-specific stream details, gender of the one or more speakers, a domain context of the audio input, the source language, and a sentiment associated with the one or more speakers.

9. The voice analysis and translation system of claim 8, wherein to identify the speech context associated with each of the one or more speakers, the processor is to:
select an audio stream from the audio input based on the speaker-specific stream details.

10. The voice analysis and translation system of claim 9, wherein to identify the speech context associated with each of the plurality of speakers, the processor is to:
identify a gender of the speaker in the audio stream,
wherein the gender is identified by a gender detector associated with the source language and the gender detector includes a Convolution Neural Network (CNN) trained in gender detection, particularly for the source language.

11. The voice analysis and translation system of claim 10, wherein to obtain the sentiment stream associated with each of the plurality of speakers, the processor is to:
select a sentiment detector associated with the gender identified by the gender detector,
the sentiment detector includes a Convolution Neural Network (CNN) trained in sentiment detection, particularly for the source language and the gender; and
obtain sentiment expressed by the speaker in the audio stream from the selected sentiment detector.

12. The voice analysis and translation system of claim 1, wherein to select the at least one translation engine from the plurality of translation engines, the processor is to:
access a Q-table including Q-values for each of the plurality of translation engines; and
identify a subset of the plurality of translation engines corresponding to a pair of the source language and the target language.

13. The voice analysis and translation system of claim 12, wherein to select the at least one translation engine from the plurality of translation engines, the processor is to:
select as the at least one translation engine one of the subset of translation engines having maximum Q-values for the pair of the source language and the target language.

14. A method of providing translating of an audio input comprising:
providing a plurality of integration layers associated with a voice analyzer and a translator of the multi-platform voice analysis and translation system, wherein the plurality of integration layers includes a first integration layer which includes a first plurality of pipelines that communicatively couples a plurality of communication applications to the voice analyzer and the translator, and a second integration layer includes a second plurality of pipelines that communicatively couples the voice analyzer and the translator with a plurality of communication platforms;
receiving, by a processor, an audio input including one or more audio streams and associated metadata via the second plurality of pipelines connected to a communication platform of the plurality of communication platforms coupled to a front end, wherein the first integration layer captures the metadata and audio streams from the audio input and transmits to the voice analyzer and translator, and
wherein each of the one or more audio streams includes voice input respectively provided by one or more speakers in a communication session;
identifying, by the processor, a speech context associated with the audio input based on the metadata,
wherein the speech context is associated with each of the one or more speakers and the speech context includes stream-wise determination of different attributes of the audio input from the one or more speakers at different times and at least one source language, a target language, and sentiment data,
wherein the speech context is identified based on a Machine Learning (ML) classification model,
obtaining, by the processor, from one or more language-specific and gender-specific sentiment detectors, sentiment data including sentiment streams corresponding to the one or more audio streams,
wherein the sentiment streams include sentiments expressed by the one or more speakers in the one or more audio streams;
selecting at least one translation engine from a plurality of translation engines for each of one or more speakers based on the speech context including the sentiment data,
wherein the at least one translation engine provides an output transcript of the audio input translated from the source language to a target language;
collecting, by the processor, feedback from each of the one or more speakers at different times of the audio input from the one or more speakers based on an accuracy of the output transcript;
training, by the processor, the ML classification model based on the collected feedback from each of the one or more speakers to identify the speech context;
producing, by the processor, a modified output transcript by modifying the output transcript based at least on the sentiment data; and
generating, by the processor, an audio output by providing the modified output transcript to a text-to-speech engine, wherein second integration layer is configured to:
receive the audio output of the voice analyzer and the translator, and
transmit the audio output though at least one of the other plurality of communication platforms that execute the communication session to the one or more speakers via the corresponding communication application from the plurality of communication applications.

15. The method of claim 14, further comprising:
extracting the metadata including the communication platform, participants including the one or more speakers, start time and end time of the communication session, joining time of participants of the communication session, the at least one source language, and the target language.

16. The method of claim 15, further comprising:
detecting a change in the speech context by monitoring the communication session.

17. The method of claim 16, wherein detecting the change in the speech context further comprises:
running a timer during the communication session;
sampling the audio input upon expiry of the timer; and
resetting the timer to run if the communication session has not concluded.

18. The method of claim 16, wherein detecting the change in the speech context includes one or more of:
detecting a change from one speaker to another speaker of the one or more speakers via a change in the one or more audio streams;
detecting a change in the at least one source language to another source language wherein the at least one source language comprises multiple source languages;
detecting a change in gender of the speaker;
detecting a change in a domain context; and
detecting an outage of the at least one translation engine.

19. A non-transitory processor-readable storage medium comprising machine-readable instructions that cause a processor to:
provide a plurality of integration layers associated with a voice analyzer and a translator of the multi-platform voice analysis and translation system, wherein the plurality of integration layers includes a first integration layer which includes a first plurality of pipelines that communicatively couples a plurality of communication applications to the voice analyzer and the translator, and a second integration layer includes a second plurality of pipelines that communicatively couples the voice analyzer and translator with a plurality of communication platforms;
analyze metadata of an audio input from one or more speakers speaking in at least one source language during a communication session, wherein the audio input includes one or more audio streams provided by a communication platform of the plurality of communication platforms,
wherein the first integration layer captures the metadata and audio streams from the audio input and transmits to the voice analyzer and the translator;
identify a speech context associated with the audio input based on the metadata,
wherein the speech context includes stream-wise determination of different attributes of the audio input from the one or more speakers at different times and the at least one source language and a target language,
wherein the speech context is identified based on a Machine Learning (ML) classification model;
select at least one translation engine from a plurality of translation engines for each of the one or more speakers based on the speech context,
wherein the at least one translation engine provides an output transcript of the audio input translated from the source language to a target language;
collect feedback from each of the one or more speakers at different times of the audio input from the one or more speakers based on an accuracy of the output transcript;
train the ML classification model based on the collected feedback from each of the one or more speakers to identify the speech context;
generate a modified output transcript by modifying the output transcript with a sentiment stream determined from the audio input;
provide an audio output generated from the modified output transcript; monitor the audio input from the one or more speakers, wherein second integration layer is configured to:
receive the audio output of the voice analyzer and the translator, and
transmit the audio output though at least one of the other plurality of communication platforms that execute the communication session to the one or more speakers via the corresponding communication application from the plurality of communication applications;
determine that the speech context has changed for at least one of the one or more speakers; and
repeat the steps of identifying the speech context, selecting at least one of the plurality of translation engines in response to the determination regarding the change of the speech context, providing the audio output, and monitoring the audio input until conclusion of the communication session.

20. The non-transitory processor-readable storage medium of claim 19, further comprising instructions that cause the processor to:
determine if the one or more audio streams are received in a single channel or respective channels;
if it is determined that the one or more audio streams are received in a single channel,
diarize the one or more audio streams into multiple channels;
and
if it is determined that the one or more audio streams are received in respective one or more channels,
split the respective one or more channels.

* * * * *